United States Patent [19]

Komanduri

[11] Patent Number: 4,714,385

[45] Date of Patent: Dec. 22, 1987

[54] POLYCRYSTALLINE DIAMOND AND CBN CUTTING TOOLS

[75] Inventor: Ranga Komanduri, Schenectady, N.Y.

[73] Assignee: General Electric Company, Schenectady, N.Y.

[21] Appl. No.: 833,928

[22] Filed: Feb. 27, 1986

[51] Int. Cl.[4] .............................................. B23P 15/28
[52] U.S. Cl. ...................... 407/119; 407/118; 76/101 R; 76/101 A; 76/DIG. 12; 125/39
[58] Field of Search ................. 407/118, 119; 51/293, 51/295, 306, 307, 309; 175/329, 330, 410; 76/101 R, 101 A, DIG. 12; 408/144, 145; 125/39

[56] References Cited

U.S. PATENT DOCUMENTS

| | | | |
|---|---|---|---|
| 3,369,283 | 2/1968 | Colding | 407/119 |
| 3,743,489 | 7/1973 | Wentorf et al. | |
| 3,745,623 | 7/1973 | Wentorf et al. | |
| 4,252,102 | 2/1981 | Phaal et al. | 407/119 |
| 4,255,165 | 3/1981 | Dennis et al. | 51/309 |
| 4,268,276 | 5/1981 | Bovenkerk | 51/309 |
| 4,373,593 | 2/1983 | Phaal et al. | 175/329 |
| 4,437,800 | 3/1984 | Arakai et al. | 407/119 |
| 4,448,591 | 5/1984 | Ohno | 407/119 |
| 4,592,433 | 1/1986 | Dennis | 175/329 |

FOREIGN PATENT DOCUMENTS

| | | |
|---|---|---|
| 0003915 | 5/1979 | European Pat. Off. |
| 0019461 | 11/1980 | European Pat. Off. |
| 0104893 | 4/1984 | European Pat. Off. |
| 0138392 | 4/1985 | European Pat. Off. |
| 1489130 | 10/1977 | United Kingdom |

OTHER PUBLICATIONS

Abstract of South African Application 80/2747, (one page).

Primary Examiner—Frederick R. Schmidt
Assistant Examiner—William E. Terrell
Attorney, Agent, or Firm—Jane M. Binkowski; James C. Davis. Jr.; Paul R. Webb, II

[57] ABSTRACT

A cutting tool comprised of a polycrystalline layer of diamond or cubic boron nitride integrally adhered to a recessed edge portion of a cemented carbide substrate structure, said layer having a tool nose of a given radius joining two substantially straight cutting edges, a face of said layer being adhered to the bottom surface of the recessed portion and a round side of the layer being adhered to the wall of the recessed portion, the thickness of the polycrystalline layer and the height of the wall being substantially equivalent.

5 Claims, 5 Drawing Figures

POLYCRYSTALLINE DIAMOND AND CBN CUTTING TOOLS

This invention relates to the production of polycrystalline diamond and cubic boron nitride (CBN) cutting tools.

U.S. Ser. No. 830,414 filed 2/18/86, filed about Feb. 18, 1986 for POLYCRYSTALLINE DIAMOND AND CBN CUTTING TOOLS by R. Komanduri, assigned to the assignee hereof and incorporated herein by reference, discloses a cutting tool comprised of a polycrystalline layer of diamond or cubic boron nitride which has a cutting edge and at least one straight edge wherein one face of the polycrystalline layer is adhered to a substrate of cemented carbide and wherein a straight edge is adhered to one side of a wall of cemented carbide which is integral with the substraight, the thickness of the polycrystalline layer and the height of the wall being substantially equivalent.

U.S. Ser. No. 833,930 filed 2/27/86, filed on even date herewith for POLYCRYSTALLINE DIAMOND AND CBN CUTTING TOOLS by R. Komanduri, assigned to the assignee hereof and incorporated herein by reference, discloses a cutting tool comprised of a polycrystalline layer of diamond or cubic boron nitride adhered to a peripheral recessed round portion of a cemented carbide substrate structure, one face of the layer being adhered to the bottom surface of the recessed portion and an inner round side of the layer being adhered to the wall of the recessed portion, said layer having a round cutting edge and a thickness equivalent to the height of the wall.

Polycrystalline diamond and cubic boron nitride cutting tools have a thin diamond/CBN layer (about 0.030 inch) on top of a cemented tungsten carbide substrate. Because of the high temperature-high pressure process and high processing costs involved in the fabrication of ultrahard tool materials the cost of these tools is very high. With the introduction of new, less expensive ceramic tools, competition is becoming intense between the superhard tools and ceramics. One way to reduce the cost of the tools is to reduce the material costs by providing small size inserts. The final size can be obtained by pressing to near-net size or pressing a larger size insert and slicing it into small segments. This invention deals with the latter case.

Another way to reduce the costs is to reduce the fabricating costs. The raw material (diamond or CBN) cost is minimized by this invention by using it only in the region where it is needed for the cutting operation. This will, at the same time, reduce the fabrication costs, since most of the tool to be fabricated involves cemented carbide material instead of the hard, super abrasive diamond or CBN. Cost of the insert can be further reduced by slicing of the specimen into four tools by wire electrical discharge machining (EDM) by this invention. The cemented carbide backing at the bottom and on the side of the resulting cutting tool provides the support base required for the relatively brittle polycrystalline diamond/CBN layer. It also facilitates brazing of the tool to the tool holder without degrading the diamond/CBN layer.

This invention will be better understood from the following description and drawings in which.

Figure 1:
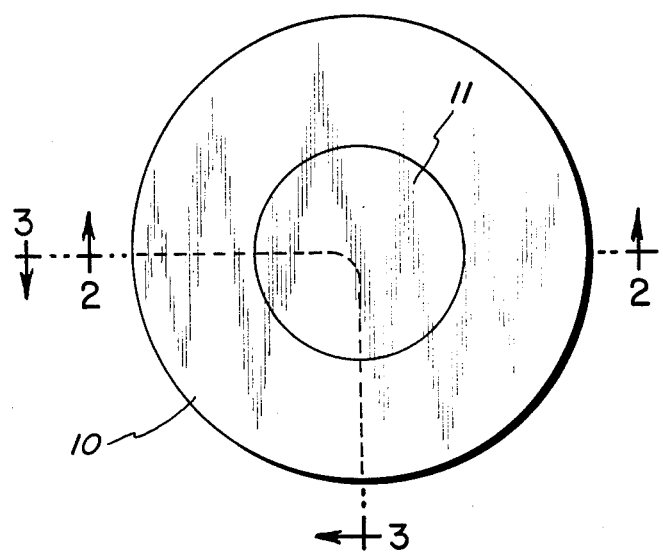
FIG. 1 is a top view of one embodiment of the present composite useful for slicing into a plurality of cutting tools.

Briefly stated, the present process for producing a composite comprised of a circular polycrystalline diamond or cubic boron nitride layer adhered in the recess of a cemented carbide substrate structure comprises forming a substrate structure comprised of a substrate with a disk-shaped recess wherein said recess is substantially centrally disposed in a face of said substrate, said cemented carbide being comprised of polycrystalline metal carbide containing a metallic cementing agent, filling said recess with crystals of diamond, heating the resulting assembly under an applied pressure to a temperature above the melting point of said metallic cementing agent but below a temperature which has any significant deleterious effect on said assembly for a period of time sufficient to form said composite and recovering said composite, the thickness of said polycrystalline diamond layer being substantially equivalent to the depth of said recess.

The structure and size of the present composite allows it to be cross-sectionally sliced to form a plurality of cutting tools.

In the present process a substrate structure comprised of polycrystalline metal carbide containing a metallic cementing agent, i.e. a cemented carbide, is used. Cemented carbide bodies are commerically available and are well known in the art, and have been used as substrates for polycrystalline diamond/CBN cutting tools.

Generally, the cemented carbide body is produced by forming a compact of a sinterable carbide molding powder into a desired shape and size and sintering the compact. Usually, the sinterable powder is comprised of a mixture of a metal carbide power and powdered metallic cementing agent, preferably selected from the group consisting of cobalt, nickel or iron. The carbide portion of the molding powder is preferably selected from the group consisting of tungsten carbide, titanium carbide, tantalum carbide, and mixture thereof (although other carbides may be added to obtain special properties). The compact is sintered in a protective atmosphere such as nitrogen or argon at a temperature which depends largely on its composition for a period of time sufficient to produce a cemented carbide of desired density. Suitable sintering temperatures generally range from about 1340° C. to about 1600° C. Generally, the composition of the compact as well as the resulting sintered body is comprised of from about 75 to 97% by weight carbide and about 3 to 25% by weight of the metallic cementing agent.

Preferably, the cemented carbide of the present invention has a porosity of less than about 15% by volume, more preferably less than about 10%, still more preferably less than about 5%, still more preferably less than about 1% by volume, and most preferably it has no significant porosity.

In carrying out the present process, a substrate structure is formed which is comprised of a substrate with a disk-shaped recess centrally or substantially centrally disposed in one face of the substrate. Generally, the substrate structure is a flat piece with its upper or top surface containing the disk-shaped recess. The bottom surface of the recess is flat or substantially flat. Preferably, the unsintered compact is in the form required of the present substrate structure and sintered to produce the present substrate structure directly. Alternatively, the present substrate structure can be produced by forming the disk-shaped recess in the sintered substrate by a technique such as, for example, electrical discharge machining. The substrate can have any of a number of desired shapes such as, for example, that of a cylinder or a square. The diameter of the cemented carbide substrate in the composite can vary depending largely on the particular cutting tools to be formed, but generally it ranges from about 0.05 inch to about 1.5 inch.

The substrate should be at least sufficiently thick so that it can be held in a cutting tool holder. Generally, the thickness of the substrate, except for its recess portion, is at least about 0.04 inch, and frequently it ranges from about 0.04 inch to about 0.25 inch.

In one embodiment, the recess of the substrate structure is provided with a four-sided elongated cemented carbide element centrally or substantially centrally disposed therein. Each side of the element is in the form of a cutting tool nose of given radius and usually all four sides are equivalent or substantially equivalent. The element is useful for forming in situ four cutting tool noses of substantially corresponding radii in the central portion of the polycrystalline diamond or cubic boron nitride layer. Specifically, the central portion of the polycrystalline layer is formed in contact with the sides of the element. The height of the element should be equivalent or substantially equivalent to the thickness of the polycrystalline layer to be formed. At this point in the process, the element may or may not be intergrally bonded to the bottom surface of the recess. If not bonded, integral bonding of the cemented carbide element to the bottom surface of the recess is effected during the present process. If desired, the element can be formed in situ by initially forming the unsintered compact into the form of the substrate structure with the unsintered element integrally extending from the bottom surface of the recess and sintering such structure. Alternatively, the element can be preformed in the sintered substrate by a technique such as electrical discharge machining. The element reduces the amount of crystals required to form the cutting tools and is especially useful for larger sized tools.

Since the substrate structure is comprised of cemented carbide, its dimensions are not significantly changed by the present process, i.e. it substantially retains its shape. In the final product, i.e. composite, the thickness of the polycrystalline diamond or cubic boron nitride layer is equivalent or substantially equivalent to the depth of the recess.

The recess of the cemented carbide substrate structure is filled with crystals of diamond or cubic boron nitride. The thickness of the filling depends largely upon the thickness and type of polycrystalline layer desired in the final produce and is determinable empirically. Preferably, the crystals fill the recess in excess of its depth to produce a higher degree of consolidation under the present high pressure conditions. The average size of the crystals can range widely and is determined empirically depending largely on the temperature and pressure conditions used as well as the type of polycrystalline layer desired in the cutting tool. Frequently, the crystals have an average size ranging from less than or about 1 micron to about 150 microns. The resulting assembly is then heated under applied pressure and temperature to produce the present composite.

Preferably, in carrying out the present process, the substrate structure is closely fitted into a cup or sleeve of a suitable shield metal with the recess exposed, and the recess is filled with diamond or CBN crystals to form the present assembly. A charge assembly is formed by capping the cup with a disc of shield metal or closing the ends of the sleeve with discs of shield metal. The enclosure of shield metal is normally used to prevent entry of oxygen in high temperature and pressure techniques used to form dense diamond or cubic boron nitride compacts as disclosed in U.S. Pat. Nos. 3,743,489 and 3,745,623, assigned to the assignee hereof and incorporated herein by reference. Representative of a useful shield metal is zirconium, titanium, tantalum, tungsten and molybdenum.

The charge assembly is then placed in the reaction vessel of a high temperature, high pressure apparatus preferably of the type used for synthesizing diamonds or dense diamond compacts.

One preferred form of a high pressure, high temperature apparatus in which the instant invention may be practiced is the belt-type apparatus disclosed in U.S. Pat. No. 2,941,248—Hall (incorporated by reference) as well as in numerous other patents and publications. Those skilled in the art should, therefore, be well acquainted with this "belt-type" apparatus and, for this reason, no effort has been made to illustrate the apparatus in the drawings.

Essentially, the apparatus consists of a pair of cemented tungsten carbide punches disposed on either side of an intermediate belt or die member of the same material. The space between the two punches and the die is occupied by the reaction vessel and surrounding gasket-insulation assemblies therefor. High pressures are generated in the reaction vessel from the compressive forces causes by the relative movement of the coaxially disposed punches toward each other within the die. Means are provided for heating the reaction vessel during the application of pressure.

Various reaction vessel configurations are shown in the patent literature (e.g. U.S. Pat. No. 3,423,177—Bovenkerk, incorporated by reference). U.S. Pat. Nos. 3,743,489 and 3,745,623 also disclose apparatus in which the present process can be carried out.

Operational techniques for simultaneously applying both high pressures and high temperatures in such apparatus are well known to those skilled in the superpressure art. There are, of course, various other apparatuses capable of providing the required pressures and temperatures that may be employed within the scope of this invention.

The assembly is heated under applied pressure to a temperature above the melting point of the cementing agent of the cemented carbide to a temperature which has no significant deleterious effect thereon for a period of time at least sufficient to produce the present composite. Generally, the temperature ranges from about 1300° C. to about 1600° C. and the time period is in excess of three minutes. The applied pressure depends largely on the particular temperature and crystals used.

Since the present bonding process is carried out at high pressures and temperatures, care must be taken not to graphitize the diamond starting material. A simple procedure employed to avoid this occurrence entails first establishing pressure conditions well within the diamond stable region on the phase diagram of carbon and thereafter raising the temperature. Specifically, when diamond is used, the minimum applied pressure should be sufficient to prevent graphitization of the diamond at the process temperature. For diamond, at 1300° C., the minimum applied pressure generally is about 50 kilobars whereas at 1400° C. the minimum pressure generally is about 52.5 kilobars.

Also, when cubic boron nitride crystals are used, sufficient pressure preferably is applied thereto before the system is heated to ensure thermodynamically stable conditions for cubic boron nitride. Specifically, when cubic boron nitride crystals are used, the minimum applied pressure should be sufficient to ensure thermodynamically stable conditions for cubic boron nitride at the process temperature. Specifically, for cubic boron nitride crystals, at 1300° C. the minimum applied pressure generally is about 40 kilobars and at 1600° C., the minimum applied pressure generally is about 50 kilobars.

In the present process, the sintering or cementing metallic agent of the cemented carbide melts and becomes fluid or semifluid and part of it is displaced from the substrate structure resulting in formation of the present composite wherein the crystals are bonded together in situ and to the substrate structure. The in situ bonding of the present composite allows the production of cutting tools therefrom without the use of brazing agents.

In one embodiment of the present process utilizing cubic boron nitride crystals, aluminum and an alloying metal of nickel, cobalt, manganese, iron, vanadium or chromium are deposited on the crystals to produce an aluminum alloy which alloys with the cementing agent during the process as disclosed in U.S. Pat. No. 3,743,489. The amount of aluminum ranges from about 1 to about 40% by weight of cubic boron nitride and the alloying metal ranges from about 2 to about 100% by weight of cubic boron nitride. Preformed aluminum alloys can be used. The aluminum alloy is particularly effective in the bonding together of cubic boron nitride crystals smaller than about 30 micrometers in largest dimension.

Upon completion of the high temperature, high pressure process, the temperature preferably is reduced first, and then the pressure to ensure the stability of the diamond or cubic boron nitride.

Upon recovery of the present composite, protective shield metal which remains affixed to the outer surfaces thereof can be ground away in a conventional manner.

The polycrystalline diamond or cubic boron nitride layer of the present composite is directly bonded to the substrate structure, i.e. to the inner surface of the recess. The in situ bonding of the composite can vary depending largely on the particular processing conditions and the particular crystals used. For example, the polycrystalline layer may form an interface with the substrate structure and/or the interface may be at least partly or mostly comprised of the cementing agent of the substrate structure. Also, the polycrystalline layer may or may not contain a metallic phase. The polycrystalline diamond or cubic boron nitride layer is sufficiently thick and contains a sufficient concentration of diamond or cubic boron nitride to make it useful as a cutting tool. Generally, for a number of cutting applications, the diamond or cubic boron nitride layer has a thickness ranging from about 0.005 inch to about 0.125 inch. Preferably, the volume fraction of diamond or cubic boron nitride is greater than 70% by volume of the layer. Frequently, the average crystal size of the polycrystalline layer ranges from about 1 $\mu$m to about 150 $\mu$m.

In one embodiment, the present composite is comprised of a disk-shaped polycrystalline diamond or cubic boron nitride layer integrally adhered to a substrate structure. The substrate structure is comprised of a substrate having a disk-shaped recess. A face of the polycrystalline layer is adhered to the bottom surface of the recess. The peripheral portion, i.e. side, of the polycrystalline layer is adhered to the inner wall of the recess. The thickness of the polycrystalline layer is equivalent or substantially equivalent to the depth of the recess. The mass of the substrate structure is significantly or substantially larger than the mass of the polycrystalline layer.

In another embodiment of the present composite, the substrate structure has an integral element which cross-sectionally passes through and is in contact with and adhered to the central portion of the polycrystalline layer. The integral element has four sides, each of which is in the form of a cutting tool nose of given radius. The central portion of the polycrystalline layer in the shape of four tool noses, each of which has a radius which is substantially equivalent to that of the side of the element with which it is in contact.

The present composite is sufficiently large to enable formation of four cutting tools therefrom. Preferably, the polycrystalline diamond or cubic boron nitride disk in the composite has a diameter of at least about 0.1 inch, and generally ranges from about 0.1 inch to about 1.5 inch.

The composite is cross-sectionally sliced to produce a plurality, usually four, of finished or unfinished cutting tools. Such slicing can be carried out in a conventional manner by, for example, electrical discharge machining or laser machining. Preferably, such slicing is carried out by wire electrical discharge machining. Preferably, before this slicing procedure, the composite is ground and polished flat to give the required shape, size and finish.

The present cutting tool is comprised of a polycrystalline diamond or cubic boron nitride layer adhered to an integral substrate structure. The substrate structure has an open recessed edge portion bounded on one side by a round or substantially round wall. The exposed portion of the polycrystalline layer has a cutting tool nose of a given radius joining two straight or substantially straight edges. Ordinarily, these straight edges are cutting edges. One face of the polycrystalline layer is adhered to the bottom surface of the recessed portion of the substrate and is coextensive or substantially coextensive therewith. The round side of the polycrystalline layer is adhered to a round wall of the recessed portion. The thickness of the polycrystalline diamond or cubic boron nitride layer and the height of the wall are equivalent or substantially equivalent. The tool nose radius generally ranges from about 0.015 inch to about 0.125 inch.

FIG. 1 shows one form of the present composite showing cemented carbide substrate 10 with disk-shaped polycrystalline diamond or cubic boron nitride layer 11 centrally disposed in a recess therein.

Figure 2:
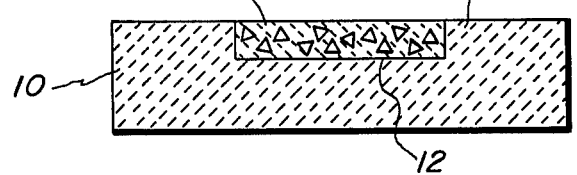
FIG. 2 is a cross section of the composite of FIG. 1 taken on line 2—2.

FIG. 2 shows the direct bonding of layer 11 in recess 12 and that layer 11 is substantially level with surface 13 of substrate structure 10.

Figure 3:
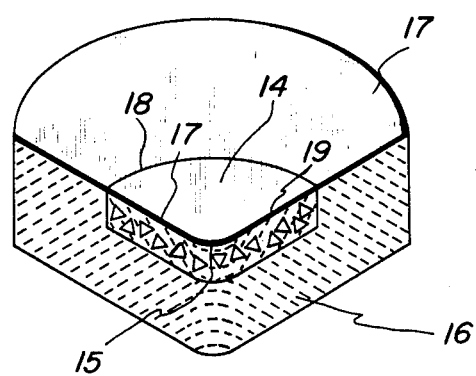
FIG. 3 is a view in perspective of a cutting tool formed by cutting through the composite of FIG. 1 on line 3—3.

By slicing the composite of FIG. 1, the cutting tool of FIG. 3 can be produced with polycrystalline layer 14 having cutting tool nose 15 of given radius joining straight edges 17 and 19. Ordinarily, edge 19 is a side cutting edge and edge 17 is an end cutting edge. The layer 14 is adhered to a recessed portion of substrate structure 16. Specifically, a face of layer 14 is integrally adhered to the bottom surface of the recessed portion of substrate structure 16 and its round side 18 is integrally adhered to a wall of the recessed portion. The top surface of layer 14 is substantially level with the top surface 17 of substrate structure 16.

Figure 4:
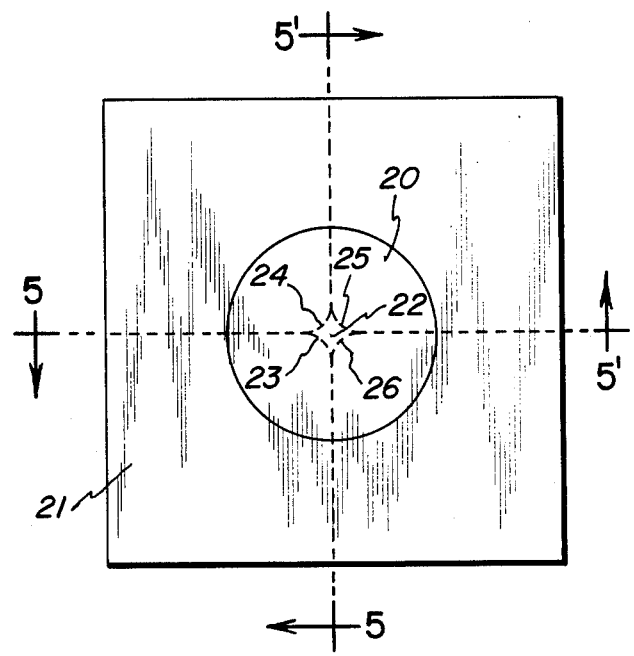
FIG. 4 is a top view of another embodiment of the present composite useful for slicing into a plurality of cutting tools.

FIG. 4 shows another form of the present composite wherein integral cemented carbide element 22 of substrate structure 21 has formed four cutting tool noses of given radii 23, 24, 25, and 26 in polycrystalline layer 20.

Figure 5:
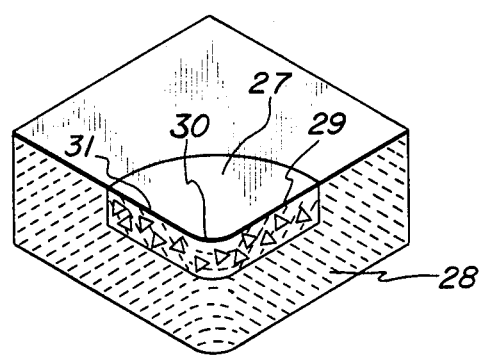
FIG. 5 is a view in perspective of a cutting tool produced by cross-sectionally slicing the composite of FIG. 4 along line 5—5 or 5'—5'.

FIG. 5 shows the cutting tool formed by cross-sectionally slicing the composite of FIG. 4. Specifically, FIG. 5 shows polycrystalline layer 27 with cutting tool nose of given radius 30 joining straight edges 29 and 31 and that layer 27 is integrally adhered to a recessed portion of substrate structure 28.

It is to be understood that the cutting tools produced by the present invention will, most usually, be mounted or bonded to a larger body, e.g. a tool shank or a milling cutter or a drill bit, for presentation to the material to be cut. The present cutting tools are useful for grinding or cutting materials having a hardness between about 2 to 9 hardness of the Moh scale. For example, the present cutting tools are useful in turning, boring and milling operations on metals such as copper, brass, bronze, silver, gold, platinum and alloys of aluminum, magnesium, steels, superalloys, titanium and zinc. The present cutting tools are also useful in the machining of non-metallic materials such as plastics, stone, concrete, composites and ceramics.

The invention is further illustrated by the following example wherein the procedure was as follows:

The substrate structure was comprised of cemented carbide, i.e. polycrystalline tungsten carbide cemented with cobalt which was present in an amount of about 13% by weight of the cemented carbide body. The cemented carbide body had a porosity of less than about 5% by volume.

The high pressure high temperature apparatus used was substantially of the same type disclosed in U.S. Pat. No. 3,745,623.

EXAMPLE 1

The composite illustrated in FIG. 1 was prepared in this example.

A cemented carbide disk about 0.125 inch thick and about 0.35 inch in diameter was subjected to electrical discharge machining to remove material therefrom to form a disk-shaped recess in its central portion. The recess had a diameter of about 0.2 inch and a depth of about 0.060 inch.

This substrate structure was fitted into a molybdenum cup with the recess-containing side exposed. The recess was then filled with a slight excess of diamond crystals having an average size range of about 10–40 μm with some fines.

The cup was then capped with a disc of molybdenum and the resulting assembly was placed in the reaction vessel of the high pressure high temperature apparatus. The pressure was raised to about 55 kilobars. The temperature was then raised to about 1450° C. where it was held for about 10 minutes. Heat input was then ceased and after the system had cooled to close to ambient temperature, the pressure was released. The resulting composite having molybdenum adhered to its outer surface was then recovered. The molybdenum deposit was removed from the composite by grinding.

The composite was surface ground on the flat faces and the periphery by cylindrical precision grinding to give the required shape, size and finish. The polycrystalline diamond layer 11 of the composite was well adhered in the recess 12 and it was substantially level with the surrounding surface 13 of the substrate structure 10. The composite was then cross-sectionally sliced into four substantially equivalent finished cutting tools using wire electrical discharge machining. Slicing of the composite along line 3—3 of FIG. 1 illustrates the production of one of the cutting tools which is shown in FIG. 3.

Each resulting cutting tool had a nose 15 with a radius of about 0.030 inch. The tool nose joined two straight cutting edges 17 and 19 as shown in FIG. 3. The adhered face and round side 18 of the polycrystalline layer 14 of each cutting tool were strongly adhered to the substrate structure 16. In each cutting tool, the polycrystalline diamond layer 14 had a thickness of about 0.05 inch and a concentration of diamond greater than about 70% by volume of the layer.

Each cutting tool, if mounted in a tool holder, would be useful for cutting materials such as the abrasive aluminum-silicon alloys.

What is claimed is:

1. A process for producing a composite of a circular polycrystalline diamond layer adhered in the recess of a cemented carbide substrate structure which comprises forming a cemented carbide substrate structure comprised of a substrate with a disk-shaped recess wherein said recess is substantially centrally disposed in a face of said substrate with an element of cemented carbide substantially centrally disposed within said recess, said element having four curved sides with each said curved side being in the shape of a tool nose of predetermined radius, said cemented carbide being comprised of polycrystalline metal carbide containing a metallic cementing agent, filling said recess with crystals of diamond, heating the resulting assembly under an applied pressure to a temperature above the melting point of said metallic cementing agent but below a temperature which has any significant deleterious effect on said assembly for a period of time sufficient to form said composite and recovering said composite, the thickness of said polycrystalline diamond layer being substantially equivalent to the depth of said recess, the height of said element being substantially equivalent to the thickness of said diamond layer.

2. The process of claim 1 wherein the central portion of said polycrystalline layer is in the form of four tool noses of predetermined radii, and said composite is cross-sectionally sliced to form four cutting tools, each cutting tool having two substantially straight edges joined by one of said tool noses of said layer.

3. A process for producing a composite of a circular polycrystalline cubic boron nitride layer adhered in the recess of a cemented carbide substrate structure which comprises forming a cemented carbide substrate structure comprised of a substrate with a disk-shaped recess wherein said recess is substantially centrally disposed in a face of said substrate with an element of cemented carbide substantially centrally disposed within said recess, said element having four curved sides with each curved side being in the shape of a tool nose of predetermined radius, said cemented carbide being comprised of polycrystalline metal carbide containing a metallic cementing agent, filling said recess with crystals of cubic boron nitride, heating the resulting assembly under an applied pressure to a temperature above the metling point of said metallic cementing agent but below a temperature which has any significant deleterious effect on said assembly for a period of time sufficient to form said composite and recovering said composite, the thickness of said polycrystalline cubic boron nitride layer being substantially equivalent to the depth of said recess, the height of said element being substantially equivalent to the thickness of said cubic boron nitride layer.

4. The process of claim 3 wherein the central portion of said polycrystalline layer is in the form of four tool noses of predetermined radii, and said composite is cross-sectionally sliced to form four cutting tools, each cutting tool having two substantially straight edges joined by one of said tool noses of said layer.

5. A composite useful for slicing into a plurality of cutting tools comprised of a disk-shaped polycrystalline diamond or cubic boron nitride layer integrally adhered to a substrate structure, said substrate structure being comprised of a substrate having a disk-shaped recess, a face of said layer being adhered to the bottom surface of said recess, the peripheral portion of said layer being adhered to the wall of said recess, the thickness of said polycrystalline layer being substantially equivalent to the depth of said recess, an integral element of said substrate structure being substantially centrally disposed within said recess passing cross-sectionally through said polycrystalline layer, the height of said element being substantially equivalent to the thickness of said polycrystalline layer, said element being in the shape of four tool noses of predetermined radii in contact with said polycrystalline layer, the mass of said substrate structure being significantly larger than the mass of said layer, said substrate structure being comprised of polycrystalline metal carbide containing a metallic cementing agent.

* * * * *